MARY A. ALVORD.
Spout-Attachment for Dumping-Carts.
No. 164,122.  Patented June 8, 1875.
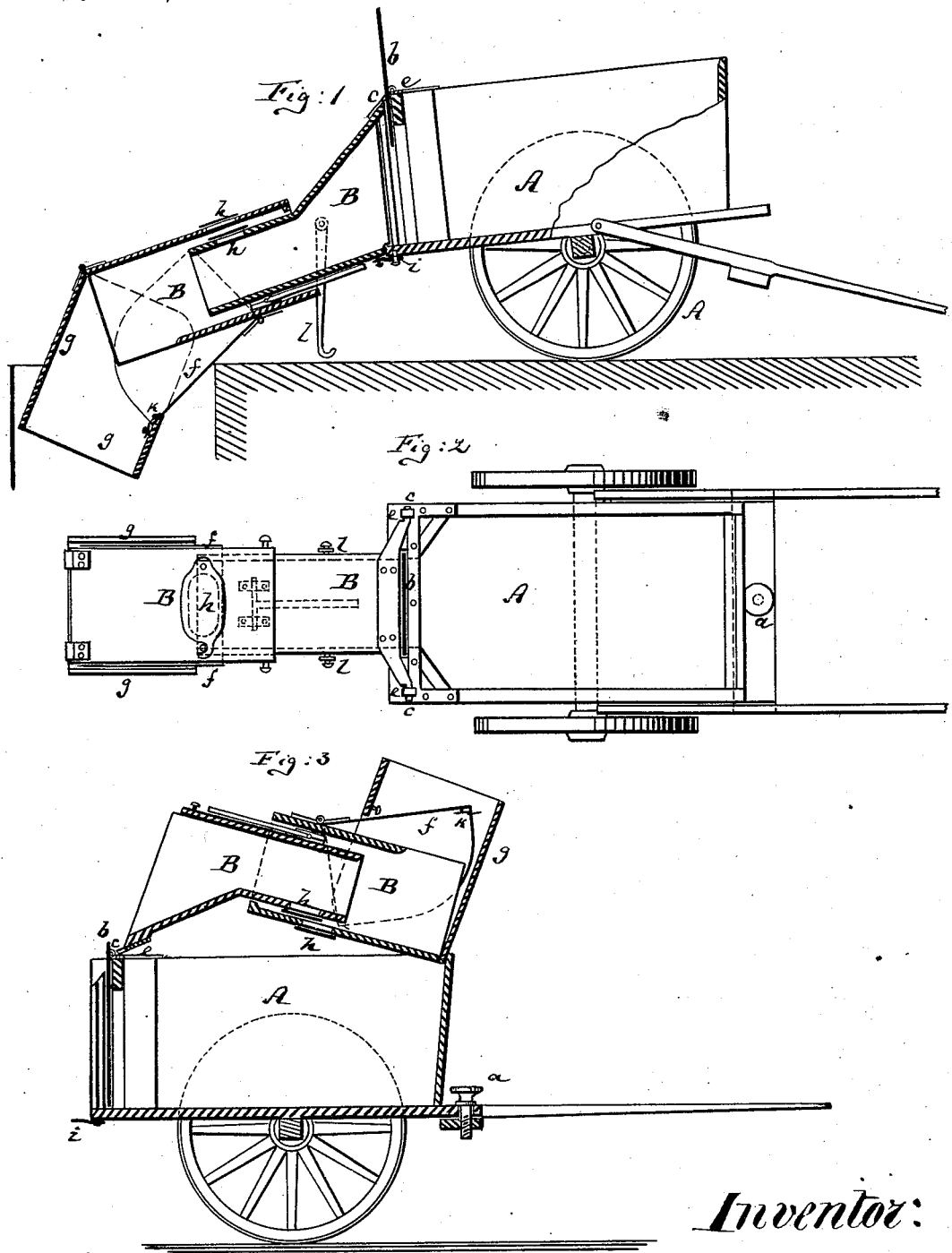

UNITED STATES PATENT OFFICE.

MARY A. ALVORD, OF NEW YORK, N. Y.

IMPROVEMENT IN SPOUT ATTACHMENTS FOR DUMPING-CARTS.

Specification forming part of Letters Patent No. 164,122, dated June 8, 1875; application filed April 29, 1875.

*To all whom it may concern:*

Be it known that I, MARY A. ALVORD, of the city of New York, in the county and State of New York, have invented an Improved Spout Attachment for Dumping-Carts, of which the following is a specification:

This invention has for its object to provide dumping-carts, inclined-bottom wagons, and other vehicles which are used for transporting and discharging coal, earth, wood, or other substances, with a hinged spout attachment, whereby the contents of such cart or wagon may, when being discharged from said vehicle, be guided directly into the coal-hole or other opening of a vault or other receptacle, but which spout, when not used, can be swung out of the way, so as not to interfere with the free motion of said vehicle.

It has heretofore been a matter of considerable inconvenience and loss of time, in the unloading of coal or other substances, that the same, on being dumped on the sidewalk, would spread upon and cover a large surface directly behind the wagon or cart, and would then have to be transported or shoveled into the vault or other receptacle, being thus a matter of annoyance to foot passengers, and producing dust, which enters the houses and soils the walk.

My invention consists in pivoting to the cart or wagon, above the rear portion of the same, a jointed or extensible spout, which, when not used, may be swung up, so as to rest on the top of the cart or wagon, but which, when used, may be let down, to form a continuous passage from the rear of the wagon to the place of discharge.

The spout attachments to wagons heretofore known were never, to my knowledge, hinged to the wagon, but consisted of a sectional conduit, the sections of which were mutually connected by a hinge, but the first section was always rigidly fastened to the wagon, so that one section could be swung on top of the other, but neither section could be swung on top of the wagon.

In the accompanying drawing, Figure 1 represents a longitudinal central section of a cart provided with my improved spout, showing the same let down. Fig. 2 is a top view of the same in the same position. Fig. 3 is a longitudinal central section of the same when the spout is swung up.

Similar letters of reference indicate corresponding parts in all the figures.

The letter A represents a cart or wagon of the kind usually used for transporting and discharging coal, wood, or other substances. The same may be of the style shown in the drawing—that is to say, of the kind pivoted to the supporting-frame, and fastened in the horizontal position by suitable bolts or screws *a a*, or otherwise; or it may be provided with an inclined bottom, or be otherwise prepared for the reception and ready discharge of coal or other substances. *b* is the slide-gate, let into the back of the cart or wagon, to close the opening through which the contents of the cart are discharged. To the wagon or cart A, and above the slide *b*, is pivoted a spout, B, the pivot-connection being preferably produced by means of lugs *c c*, which project from the spout, and pass through loops or eyes *e e*, that are attached at both sides of the wagon A, or otherwise. The spout B may consist of one piece of prismatic or other shaped tubing; or it may be made of two or more pieces of telescoping tubing, so that it may be readily extended or contracted; and it may be either entirely closed at its sides and top, or may be left open at the top. This spout may be provided with a hinged discharge-blade, *f*, at or near its lower end, which can be swung to a greater or less degree of inclination, and which is inserted with its end in the coal-hole. Above said blade is, by preference, hinged to the spout a guard, *g*, which prevents the discharged matter from flying onto the sidewalk during the momentum of its fall, and from being thrown beyond the place where it is to be deposited. Apertures *h h*, that may be opened or closed by lids, may be cut into the upper part of the spout, so as to admit rods or shovels for stirring the discharged material in case the same should clog the spout; but the spout may also be left entirely open on top. *i* is a hook or catch, attached to the bottom of the wagon or cart A, and engaging into a loop fastened to the lower side of the spout B, so as to firmly fasten the same to the lower part of the wagon when swung down, as in Fig. 1. *k* is a brace, pivoted to the spout, for locking the guard *g* in the proper position. Other hooks or catches $l\ l$ serve to prevent the tubes from sliding off each other in case two or more pieces of telescoping tubing are used.

The operation of the spout is as follows: When the contents of the wagon or cart A are to be discharged, the spout attachment is placed in the position shown in Figs. 1 and 2—that is to say, swung down, so it will extend from the back portion of the wagon to the coal-hole or place to which the contents of the wagon are to be guided. The slide $b$ of the wagon is then raised, and the wagon or cart then dumped in the usual manner. It will then discharge its contents into the spout B, which will conduct the contents to the place where they are to be deposited. After the contents of the cart or wagon have been discharged the hook $i$ is loosened, and the entire spout swung up into the position shown in Fig. 3—that is to say, resting on top of the wagon, so as not to interfere with the free motion of the wagon.

Instead of hinging the spout directly to the cart or wagon, it may be made entirely detachable, so that the wagon could be used without it, if desired.

I am aware that a cart for unloading coal has been shown in the Patent No. 73,684, granted to J. H. Wood; but the same is not provided with a spout that can be folded on top of the cart, nor with the discharge-blade and guard shown in my application; and I therefore claim—

1. The combination of a dumping-wagon, A, with a discharge-spout, B, hinged thereto at $e\ e$, in such a manner that it may rest entirely on the top of the cart as set forth.

2. The vehicle discharge-spout B, consisting of one or more troughs or tubes, and of the pivoted blade $f$, substantially as herein shown and described.

3. The pivoted guard $g$, combined with the blade $f$ and discharge-spout B of a dumping-wagon, substantially as specified.

M. A. ALVORD.

Witnesses:
  E. C. WEBB,
  F. V. BRIESEN.